US005214718A

United States Patent [19]

Khosla

[11] Patent Number: 5,214,718

[45] Date of Patent: May 25, 1993

[54] SCAN-IN POLYGONAL EXTRACTION OF VIDEO IMAGES

[75] Inventor: Ashok M. Khosla, Palo Alto, Calif.

[73] Assignee: Ampex Systems Corporation, Redwood City, Calif.

[21] Appl. No.: 963,281

[22] Filed: Oct. 19, 1992

Related U.S. Application Data

[63] Continuation of Ser. No. 312,297, Feb. 17, 1989, abandoned, which is a continuation of Ser. No. 915,476, Oct. 6, 1986, abandoned.

[51] Int. Cl.[5] .............................................. G06K 9/48

[52] U.S. Cl. ......................................... 382/22; 358/75; 358/318; 382/21; 382/60

[58] Field of Search ....................... 382/22, 25, 50, 52, 382/21, 60, 56; 358/27, 28, 21, 318, 465, 466, 75; 340/730

[56] References Cited

U.S. PATENT DOCUMENTS

| | | | |
|---|---|---|---|
| 4,189,711 | 2/1980 | Frank | 382/22 |
| 4,298,945 | 11/1981 | Kyte et al. | 340/730 |
| 4,375,654 | 3/1983 | Evans et al. | 382/21 |
| 4,545,067 | 10/1985 | Juvin et al. | 382/21 |
| 4,566,124 | 1/1986 | Yamamoto et al. | 382/22 |
| 4,575,751 | 3/1986 | Duschl | 382/22 |
| 4,613,948 | 9/1986 | Gharavi | 382/52 |
| 4,639,771 | 1/1987 | Hattori et al. | 358/27 |
| 4,644,583 | 2/1987 | Watanabe et al. | 382/22 |
| 4,703,512 | 10/1987 | Saka et al. | 382/60 |
| 4,771,474 | 9/1988 | Takashima et al. | 382/22 |
| 4,777,651 | 10/1988 | McCann et al. | 382/21 |
| 4,853,971 | 8/1989 | Nomura | 382/22 |

FOREIGN PATENT DOCUMENTS

| | | |
|---|---|---|
| 1297600 | 3/1992 | Canada . |
| 0112499 | 7/1984 | European Pat. Off. . |
| 0115462 | 8/1984 | European Pat. Off. . |
| 0166525 | 1/1986 | European Pat. Off. . |
| 0173098 | 3/1986 | European Pat. Off. . |
| 0263584 | 4/1988 | European Pat. Off. . |

OTHER PUBLICATIONS

Ballard et al., Computer Vision, Prentice Hall, 1982, pp. 232–235.

Rosenfeld et al., *Digital Picture Processing*, Academic Press, 1982, pp. 191–275.

"An Architecture For High Speed Contour And Region Coding Of Threshold Images", by Eric D. Petajan, *Proceedings of the IEEE International Conference On Computer Design: VLSI In Computers*, Oct. 9, 1986, pp. 502–505.

"An Iterative Procedure for the Polygonal Approximation of Plane Curves", by Urs Ramer, *Computer Graphics & Image Processing*, Apr./Dec. 1972, pp. 244–256.

"Encoding of Binary Images by Raster-Chain-Coding of Cracks", by Per-Erik Danielsson, *IEEE Proceedings of the International Conference on Pattern Recognition*, 1982, pp. 335–338.

*Primary Examiner*—Joseph Mancuso

*Attorney, Agent, or Firm*—Patrick C. Keane; John R. Lastova; James A. LaBarre

[57] ABSTRACT

A video image is extracted and stored as a geometric figure by generating a binary pixel map of the image. The binary pixel map contains one bit for each pixel in the image, representative of the value of a characteristic feature of that pixel relative to a threshold range. A crack following algorithm locates the border of a group of contiguous pixels all having the same binary value. This border defines the boundaries of the scanned image. It is smoothed by a recursive adaption technique to generate one or more polygons related to the shape of the image.

15 Claims, 2 Drawing Sheets

Fig. 4
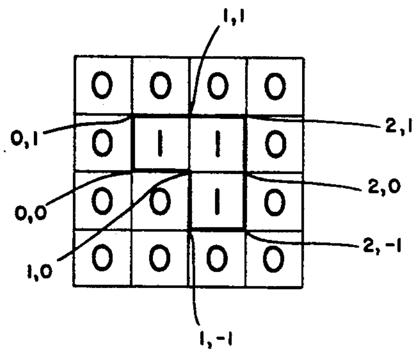
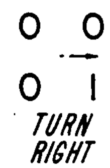
Fig. 5A
Fig. 5B
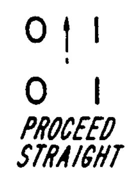
Fig. 5C
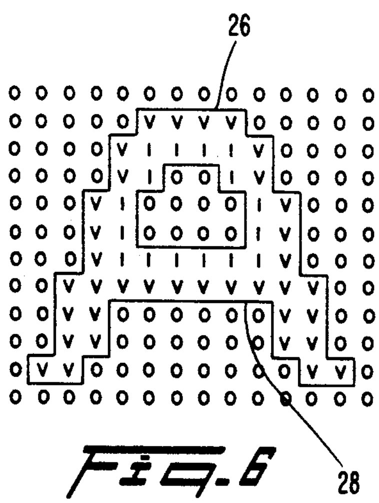
Fig. 6
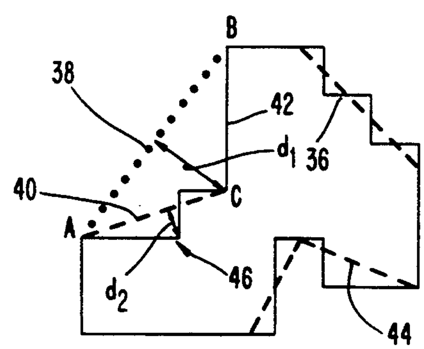
Fig. 7

SCAN-IN POLYGONAL EXTRACTION OF VIDEO IMAGES

This application is a divisional of application Ser. No. 07/312,297, filed Feb. 17, 1989, which is a continuation of application Ser. No. 06/915,476, filed Oct. 6, 1986, both now abandoned.

BACKGROUND OF THE INVENTION

The present invention is directed to the scanning and storage of video images, such as letter fonts and symbols, for use in video graphics.

In the field of video graphics it is useful to store and retrieve various images to create a particular video picture. In this regard, it is particularly desirable to store and retrieve predetermined alphanumeric character fonts. A stored library of fonts enables different types of textual messages to be selectively displayed on a video screen. Of a more general nature, it is desirable to be able to extract and store all kinds of images for selective retrieval and presentation in a video graphic display. The process of storing the characteristic features of a video image is referred to as "scan-in" of that image.

A scan-in method involves the preliminary step of providing a raster scanned version of the image, e.g. a symbol or character. For example, such a version can be obtained by taking a picture of the symbol with a video camera. The raster scanned image is analyzed to determine the characteristics of the symbol, and these characteristics are stored in a library for future retrieval.

In the past, the characteristic information describing a scanned image was stored in the form of a bit map. More particularly, each pixel of a video image was analyzed to determine its red, green and blue color components. This color information for each pixel was arranged in a bit map having memory cells corresponding to the pixels of the video image. When the character was to be subsequently reproduced in a video picture the corresponding pixels in the appropriate portion of the picture were controlled in accordance with the information in the bit map.

The bit map approach to storing scanned image information poses certain limitations if the image is to be reproduced at a size other than that at which it was originally scanned in. For example, if it is desirable to reduce the size of the displayed image to ¼ of the original scanned size, the information concerning each group of four pixels in the bit map must be reduced to a single pixel in the displayed image If two of the original four pixels represent white and the other two represent black, it will be appreciated that some form of decision making criteria must be established to determine whether the single pixel in the displayed image is to be white or black. Regardless of which choice is made, the displayed image will not have the full integrity of the original scanned image. Typically, a relatively complex filtering procedure is utilized to carry out a reduction or amplification in the size of a video image. Even with such procedures, however, a loss in the integrity of the image occurs because arbitrary decisions of the type referred to above must be made.

In the field of video graphics, it is often more desireable to store information concerning an image in terms of its geometry, i.e. by means of vector representations, rather than in a pixel-related bit map. The vector information can be more easily modified to change the size of an image without losing the integrity of the image. In the past, however, vector representation has not been done with images which are extracted from a video frame, such as character fonts and symbols.

Further along these lines, the vector representation approach more readily facilitates the editing of character images. For example, it may be desirable to change the geometry of a stored character in order to smooth out a sharp corner or the like. In the bit-map approach, this change is performed by modifying the value of a bit. This type of change may become readily apparent and appear awkward when the size of the character is subsequently changed, particularly if it is enlarged. However, changes in the geometry of an image that is stored in terms of vector representations are more easily accommodated.

Another advantage of the vector representation of video images lies in the fact that the information about the image is more easily transferred from one video machine to another. Geometric information can be readily interpreted and sent to various machines in a consistent fashion. However, pixel arrangements may vary from machine to machine, so that a bit mapped image that is extracted on one machine may not be accurately reproduced on another machine.

BRIEF STATEMENT OF THE INVENTION

Accordingly, the present invention provides a novel scan-in technique that enables information concerning character fonts and other predetermined images to be stored in terms of vector representations.

Briefly, in accordance with the present invention a binary bit map of a scanned image is created with each bit corresponding to a pixel of the image. This bit map can be created by digitizing a video image and storing it in a frame store in terms of any conventional form of color space, such as its red, green and blue component information. If desired, it can be converted from one color space to another. For example, the red, green, blue information can be converted into corresponding luminance, intensity and chroma information. Each pixel is assigned a binary one or zero in dependence upon whether one or more of the color space parameters lies within a threshold range. For example, the luminance value of a pixel can be compared to a threshold valve.

Once the binary map for the image is created, rasterized polygons are extracted from the binary map. These polygons are detected and extracted through the use of a crack following algorithm. Basically, this algorithm locates the interface between a group of contiguous pixels all having the same binary value, e.g., all ones, and the adjacent pixels of the opposite value. These interfaces are closed loops which define rasterized polygons and can be identified by means of coordinate values related to the grid of pixels.

The rasterized polygons are smoothed by an approximation technique to generate a piece-wise linear polygon. This approximation technique preferably utilizes recursive adaption with a user defined tolerance to provide an optimal fit. Thesides of the resulting linear polygon can be represented as vectors in a coordinate system. Thus, the invention enables character fonts and other predefined images to be stored as vector representations.

Further features of the invention are described in detail hereinafter with reference to a preferred embodiment illustrated in the accompanying drawings.

BRIEF DESCRIPTION OF THE DRAWINGS

FIG. 4 is an enlarged view of a binary bit map;

FIGS. 5A–5C are examples of portions of a bit map illustrating the steps that are followed in the crack-following algorithm;

FIG. 6 is an illustration of the bit map of FIG. 2 after the exterior polygon has been extracted; and FIG. 7 is an illustration of the steps that are followed in the procedure for fitting the rasterized polygon with a piece-wise linear polygon.

DESCRIPTION OF THE ILLUSTRATED EMBODIMENT

As an illustrative example, a preferred embodiment of the present invention will be described in the context of scanning in a particular font for the letter "A". It will be appreciated, however, that the invention is not so limited, and can be applied to the extraction and storage of any video image.

Figure 1:
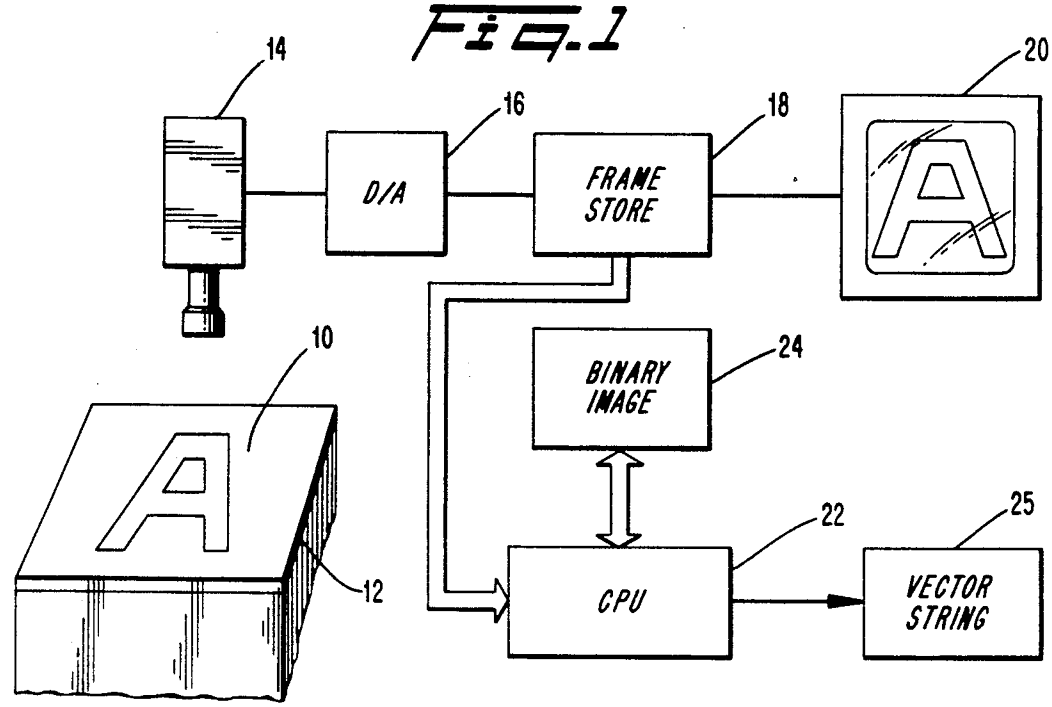
FIG. 1 is a partial perspective and partial block diagram view of a scan-in system which operates in accordance with the invention.

Referring to FIG. 1, a video image of the desired character font can be obtained by taking a picture of the character at full video screen size with a video camera. A sheet of paper 10 or other medium containing the character is placed on a table 12. A video camera 14 produces an output signal containing information regarding the image. Typically, this output signal presents the information in terms of the red, green and blue components of the scanned image, although it could be in terms of any other type of color space. This information is digitized in an analog-to-digital converter 16 and stored as a frame of video information in a frame store 18. The scanned and stored image can be displayed on a video monitor 20.

The image to be scanned in need not be produced by a video camera. It can come from any suitable source of video images. For example, it can be replayed from a video tape or retrieved from any other type of video storage medium, or it can be generated using video graphic techniques.

As a first step in defining the character font, the scanned video image is transformed into a binary image. In a preferred embodiment of the invention, the red, green and blue (RGB) information for each pixel in the frame store 18 is converted into corresponding luminance, intensity and chroma (YIQ) information. The technique for making such a conversion is conventional in the art, and therefore will not be discussed in detail herein. It can be carried out, for example, by means of a suitable programmed central processing unit 22 connected to the frame store 18.

Figure 2:
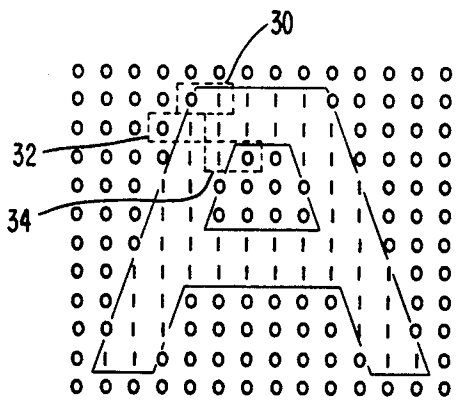
FIG. 2 is a binary map representation of a character.

The YIQ information for each pixel is then transformed into a binary bit of data by thresholding that information. For example, if the scanned image comprises a relatively dark character on a light background as shown in FIG. 1, the luminance (Y) value for each pixel provides a good basis for obtaining the binary data. In particular, the threshold range might be established as 0 to 0.3 , where a zero luminance value represents black and a one luminance value represents white. Each pixel having a luminance value less than the threshold value of 0.3 would be labelled with a binary one, and all pixels having a luminance of 0.3 or greater would be labelled a binary zero. For the character shown in FIG. 1, the binary pixel map might appear as illustrated in FIG. 2, and is stored in a binary image memory 24.

Depending on the particular image being scanned, other thresholding criteria might be more preferable. For example, if the desired character appears on a multi-color or patterned background, chroma (Q) or intensity (I) might prove to be better parameters on which to base the thresholding decision. Furthermore, it is possible to use a combination of two or three of these parameters (e.g. $0.5Y+0.3I+0.2Q>x$, where x is the threshold value) to determine whether a pixel in the binary bit map has a value of one or zero. Also, the thresholding decision can be carried out relative to multiple threshold values that define a window, e.g. $0.3<Y<0.6$, to determine binary the value of a pixel. Similarly, the parameters that are used in the thresholding function might be those defined by another type of color space, e.g. the R, G and B values.

Figure 3:
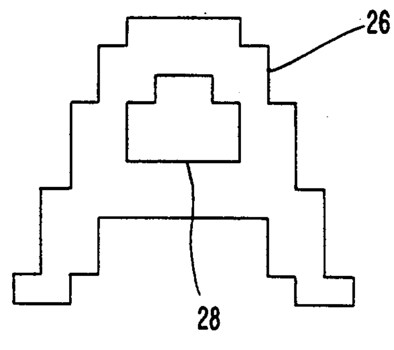
FIG. 3 is an illustration of the rasterized polygon that is extracted from the binary map of FIG. 2.

Once the binary pixel map is created, one or more polygons which define the shape of the character are extracted from it. These polygons all fall into one of two categories, exterior polygons and interior polygons. FIG. 3 illustrates that the character "A" shown in FIG. 2 has one exterior polygon 26 and one interior polygon 28. These polygons are referred to as "rasterized" polygons since they have shapes which are defined by the edges of the pixels in the raster-scanned image.

The polygons are extracted by locating the interface, or "crack", between the groups of pixels which are all binary ones and the adjacent binary zero pixels. To locate the crack, the binary pixel map is scanned on a line by line basis, and adjacent pairs of pixels are analyzed to determine whether they contain significant data. Significant data is detected when two adjacent pixels respectively contain different binary data. With reference to the binary pixel map of FIG. 2, it can be seen that the first row of the map, which contains all zeros, does not represent significant data. In the second row of the map, a 0,1 sequence of bits occurs at the upper left hand corner 30 of the character. The detection of this sequence represents the start of a crack.

Once this start is located, a crack following algorithm is carried out to define the shape and extent of the crack. The operation of the crack following algorithm is illustrated with reference to the 4×4 binary pixel map illustrated in FIG. 4. It is assumed that the 0,1 sequence of bits occurring in the second row of the map has been detected to locate the start of a crack. The occurrence of a 0,1 bit pattern represents an exterior polygon. The lower left hand corner of the 1 pixel is assigned a starting coordinate value 0,0, and a pointer is oriented to proceed in the upward direction. In the extraction of an exterior polygon, the pointer then advances up to the coordinate point 0,1. The value of the 4 pixels adjacent this coordinate point are then detected to determine the next direction in which to advance.

At each point along the crack, there are three possible directions to proceed, i.e. right, left or straight. These three possibilities are illustrated in FIGS. 5A–5C. If any other bit pattern should be present, it will be recognized as an error condition, i.e., the pointer is not located on the crack.

In dependence upon the particular one of the three conditions that is detected, the pointer advances in the direction indicated by the detected condition. Thus, with reference to the bit map of FIG. 4, once the pointer is located at the coordinate position 0,1 the crack following algorithm will indicate that a right turn must be made. The pointer will then advance to the position 1,1. At this point, the algorithm will dictate that the pointer continue to move in a straight direction, to the coordinate point 2,1. This procedure continues, with the algorithm causing the pointer to advance to each successive point along the crack between the group of three contiguous pixels having the value of one and their adjacent zero pixels.

As the pointer proceeds around the crack, the coordinate value of each point is recorded. Thus, the output of the algorithm comprises a string of coordinate values which define the crack, or rasterized polygon, around the group of binary one pixels. In the example of FIG. 4, this pixel string is as follows: (0,0), (0,1), (1,1), (2,1), (2,0), (2,−1), (1,−1), (1,0).

Further information regarding crack following algorithms can be found in Rosenfeld and Kak, *Digital Picture Processing,* Academic Press, 1982, particularly pages 219–231, the disclosure of which is herein incorporated by reference thereto. The algorithm is carried out in the CPU 22, preferably by means of a look-up table which determines the orientation of the pointer as the values of each set of pixels is detected. The coordinate values that are generated by the algorithm are stored in an appropriate memory unit 25.

Once the polygon has been defined, the crack locating procedure continues to determine whether any other polygons exist within the binary pixel map. For example, after the exterior polygon 26 of the character illustrated in FIG. 2 has been determined, the interior polygon 28 must also be detected and followed. It will be appreciated that as the search for additional polygons is carried out, a 0,1 bit sequence 32 will be detected in the third row of the binary pixel map of FIG. 2. This could cause the exterior polygon of the character to again be followed. Preferably, to prevent such duplicative effort, each binary one pixel that is detected during the crack following algorithm is labelled with an indicator. For example, the binary one value of the pixel can be changed to some other value, such as a "V" to indicate that the pixel has been visited. In this case, the binary pixel map will appear as shown in FIG. 6. Thus, as the search for additional polygons continues, each pixel that is labelled with a V will not be detected as representing significant data.

The search for other polygons will continue until the fourth row of the map is scanned, at which time the 1,0 bit sequence 34 will be detected to indicate the start of an interior polygon. In the previous example regarding the tracking of an exterior polygon, the algorithm pointer followed the crack in a clockwise direction. In order that the area of both exterior and interior polygons be consistently defined, the algorithm proceeds around the interior polygon with a counterclockwise orientation. Thus, the starting point for the crack comprises the upper left hand corner of the zero pixel in the 1,0 sequence. The algorithm then proceeds in the same fashion to follow the interior crack. As it proceeds, each coordinate value of the crack is detected and emitted in a pixel string. In addition, the value of each binary one pixel is changed to the V indicator.

The character illustrated in FIG. 2 comprises only two polygons. Thus, after the interior polygon has been followed to generate the second pixel string, no further 0,1 or 1,0 pairs will be detected in the map. Accordingly, the boundary of the character font is defined by the two pixel strings representing the exterior and interior rasterized polygons shown in FIG. 3.

As a final step in the scan-in procedure, the rasterized polygon is smoothed by fitting it with a piece-wise linear polygon. This fitting technique is preferably carried out by means of recursive adaption with an operator-defined resolution.

Such a technique is illustrated with reference to FIG. 7. This figure illustrates, in solid lines, a rasterized polygon 36 that is to be fitted with a piece-wise linear polygon. To initiate the fitting process, two extreme points A,B on the rasterized polygon are identified and a straight line 38 is drawn between them. The largest distance $d_1$ between this line 38 and the polygon 36 is measured. If this distance is larger than an operator settable tolerance, the original line 38 is disregarded and a new test line 40 is drawn between the starting point A and the point C on the polygon which was farthest from the line 38. The distance $d_2$ between the new line and the polygon is then measured. If this distance is within the tolerance, the line 40 is maintained as a side of the piece-wise linear polygon. Another line 42 is then drawn between the points B and C. Since this line coincides with the rasterized polygon, it will be maintained as part of the ultimate polygon.

This procedure continues until a complete polygon 44 (represented by the combination of dashed and heavy solid lines) is complete. The coordinate values of the corners of this polygon, i.e. the points A, B, C, etc., are stored as a vector representation of the polygon which defines the character or symbol. If the operator desires greater resolution in the definition of the polygon 44, the tolerance level can be suitably adjusted.

By storing the image as a vector representation of a polygon, editing of the image, including size enlargement and reduction, is readily facilitated without compromising the integrity of the displayed image. Since all of the sides of the polygon are linear, appropriate magnification is obtained by simply multiplying the length of each side by the magnification factor and determining new coordinate values corresponding to the new lengths. Similarly, the shape of the polygon can be edited by merely adding or changing coordinate points. For example, in the polygons illustrated in FIG. 7, an additional coordinate value corresponding to the point 46 in the rasterized polygon can be added to the vector representation to vary the shape of the corresponding corner in the linear polygon.

It will be appreciated by those of ordinary skill in the art that the present invention can be embodied in other specific forms without departing from the spirit or essential characteristics thereof. In particular, although disclosed with respect to the scan-in of a character font, it can be used for the extraction of any video image. The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

I claim:

1. A method for storing a video image as a polygonal representation of that image for subsequent retrieval to create a color video picture, comprising the steps of:

scanning a video frame which includes said video image;

storing color information describing an array of pixels corresponding to said video frame with the information pertaining to each pixel of the array containing a plurality of values regarding a plurality of characteristic color parameters;

comparing the value of at least one parameter of each pixel to a threshold value and generating a binary pixel map containing information relating to said comparisons;

determining interfaces between adjacent locations in said pixel map which contain dissimilar information to thereby create a rasterized polygon by labelling pixel map locations of an interface with indicators during a first scan of the pixel map such that said labelled pixel locations are not detected during a second scan of the pixel map;

approximating said rasterized polygon with a piecewise linear polygon to define a polygon having a shape related to said interface; and storing said linear polygon as a vector representation of the image for subsequent retrieval to create the color video picture.

2. The method of claim 1 wherein said stored values relate to the red, green and blue components of each pixel and further including the step of converting the red, green and blue values for each pixel into corresponding luminance, intensity and chroma values, and wherein said comparing step comprises a comparison of one of the luminance, intensity and chroma values for a pixel relative to said threshold range.

3. The method of claim 2 wherein the luminance value is the parameter that is compared to the threshold range.

4. The method of claim 2 wherein a combination of at least two of said luminance, chroma and intensity values is compared to the threshold range.

5. The method of claim 1 wherein a combination of the values of at least two of said parameters is compared to the threshold range.

6. The method of claim 1 wherein said interface determining step comprises the steps of determining a series of coordinate values which define a closed loop interface between sets of pixel map locations containing dissimilar information.

7. The method of claim 6 wherein the first coordinate value in said series is determined by scanning successive rows of said pixel map and detecting the occurrence of two adjacent pixels having dissimilar binary values.

8. The method of claim 1 wherein said approximation comprises a recursive adaption technique having a predetermined tolerance.

9. The method of claim 1, wherein said video picture is a graphical video image.

10. A method for creating video graphics which include a scanned video design, comprising the steps of:

scanning the design to create a frame of video data containing space values;

generating a video pixel representation of the design by comparing at least one of the space values for each pixel to a threshold value, generating binary data indicative of a result of said comparison for each pixel, and storing said data in a binary data map having cells corresponding to pixels in a pixel array;

determining a set of values which indicate a location of pixels at borders of said binary data map by labelling border pixel locations detected during a first scan with indicators such that said labelled border pixel locations are not detected during a second scan of the labelled pixel locations;

storing said set of values as vectors in a coordinate system, said vectors corresponding to a polygonal representation of the design; and retrieving said stored vectors to generate the design in a video graphic image.

11. The method of claim 10 wherein said determining step comprises the steps of detecting two adjacent cells in said bit map which contain different binary data, tracking the interface between a first set of contiguous cells which contain one type of binary data and a second set of cells adjacent to said first set that contain another type of binary data, and generating a series of coordinate values which define said interface.

12. The method of claim 11 further comprising the step of analyzing said series of coordinate values by means of recursive adaption to produce a polygon which approximates said interface within a tolerance range, said stored vectors comprising the coordinate values of said polygon.

13. The method of claim 10 further including the step of editing the design by multiplying the retrieved vectors by a magnification factor to change the size of the design.

14. Apparatus for extracting and storing a color image in a video frame for subsequent creation of a video graphic, comprising:

means for scanning said color image and storing plural values regarding plural characteristic color components for each pixel in the video frame;

means for generating from said scanned color image a binary pixel map representing a characteristic color component of each pixel in the video frame;

means for locating pixels in said map which correspond to borders of the image by determining a location of adjacent pixels in said map that have complementary binary values and by labelling border pixel locations detected during a first scan with indicators such that said labelled border pixel locations are not detected during a second scan of the labelled border pixel locations;

means responsive to said locating means for generating a first set of coordinate values which define a rasterized polygon;

means for smoothing said rasterized polygon to generate a second set of coordinate values which define a linear polygon; and means for storing said second set of coordinate values and subsequently retrieving said stored values to create a linear polygon for use in recreating a color video graphic image.

15. The method of claim 10 wherein said stored values relate to the red, green and blue components of each pixel and further including the step of converting the red, green and blue values for each pixel into corresponding luminance, intensity and chroma values, and wherein said comparing step comprises a comparison of one of the luminance, intensity and chroma values for a pixel relative to said threshold range.

* * * * *